US012658638B2

(12) United States Patent
Tanaka et al.

(10) Patent No.: US 12,658,638 B2

(45) Date of Patent: Jun. 16, 2026

(54) ELECTRICAL CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Tanaka, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 348 days.

(21) Appl. No.: 18/274,680

(22) PCT Filed: Jan. 25, 2022

(86) PCT No.: PCT/JP2022/002497

§ 371 (c)(1),
(2) Date: Jul. 27, 2023

(87) PCT Pub. No.: WO2022/172740

PCT Pub. Date: Aug. 18, 2022

(65) Prior Publication Data

US 2024/0088607 A1 Mar. 14, 2024

(30) Foreign Application Priority Data

Feb. 15, 2021 (JP) ................................ 2021-021401

(51) Int. Cl.
*H01R 13/627* (2006.01)

(52) U.S. Cl.
CPC ................................ *H01R 13/6272* (2013.01)

(58) Field of Classification Search
CPC ........................ H01R 13/6272; H01R 13/6271
(Continued)

(56) References Cited

U.S. PATENT DOCUMENTS 5,378,168 A * 1/1995 Sumida .............. H01R 13/6272 439/357
7,503,793 B2 * 3/2009 Morello ............. H01R 13/6272 439/352

(Continued)

FOREIGN PATENT DOCUMENTS

JP 2015-103372 A 6/2015
JP 2020-191261 A 11/2020

OTHER PUBLICATIONS

International Search Report issued on Mar. 29, 2022 for WO 2022/172740 A1 (4 pages).

*Primary Examiner* — Gary F Paumen
(74) *Attorney, Agent, or Firm* — Venjuris, P.C

(57) ABSTRACT

A connector (10) is provided with a housing (11) and a terminal fitting (12) to be accommodated into the housing (11). The housing (11) includes a housing body (20), a pair of side walls (21), a lock arm (23) and a projection (24). The housing body (20) accommodates the terminal fitting (12). The pair of side walls (21) project from an outer surface of the housing body (20) and are arranged side by side in a width direction of the housing (11). The lock arm (23) is arranged between the pair of side walls (21) and supported on the pair of side walls (21) displaceably like a seesaw. The projection (24) is provided on a facing surface of the housing body (20) and the lock arm (23) and serves as a fulcrum of a seesaw movement of the lock arm (23).

7 Claims, 11 Drawing Sheets

(58) Field of Classification Search
USPC .................................................. 439/350, 358
See application file for complete search history.

(56) References Cited

U.S. PATENT DOCUMENTS

| | | | | |
|---|---|---|---|---|
| 7,559,787 | B2 * | 7/2009 | Shigeta .............. | H01R 13/6272 439/358 |
| 8,678,844 | B2 * | 3/2014 | Yoshisuji ............. | H01R 13/641 439/495 |
| 9,780,489 | B2 * | 10/2017 | Kanda ................ | H01R 13/6272 |
| 9,929,508 | B2 * | 3/2018 | Puhl ................... | H01R 13/6666 |
| 2004/0005805 | A1 * | 1/2004 | Shibata .............. | H01R 13/5219 439/358 |
| 2008/0176436 | A1 | 7/2008 | Morello | |
| 2017/0338593 | A1 | 11/2017 | Puhl et al. | |
| 2019/0044278 | A1 | 2/2019 | Amemiya et al. | |
| 2020/0091656 | A1 | 3/2020 | Lee et al. | |
| 2020/0136307 | A1 * | 4/2020 | Tanaka ................. | H01R 13/641 |
| 2020/0259296 | A1 | 8/2020 | Tajima et al. | |

* cited by examiner

ELECTRICAL CONNECTOR

CROSS REFERENCE TO RELATED APPLICATIONS

This application is a national phase of PCT application No. PCT/JP2022/002497, filed on 25 Jan. 2022, which claims priority from Japanese patent application No. 2021-021401, filed on 15 Feb. 2021, all of which are incorporated herein by reference.

TECHNICAL FIELD

The present disclosure relates to a connector.

BACKGROUND

Patent Document 1 discloses a connector provided with a housing. The housing includes a receptacle, a pair of left and right side walls provided on the outer peripheral surface of the receptacle and a lock arm arranged between the pair of side walls. The lock arm includes an arm body extending in a front-rear direction and a pair of coupling portions linking both left and right side parts of the arm body and the respective side walls.

A front end part of the arm body is deflected and deformed upward by being pushed by a lock portion of a mating housing, resiliently returns and is locked by the lock portion of the mating housing in the process of connecting the housing to the mating housing. In this way, a connected state of the housing and the mating housing is maintained.

Further, if a rear end part of the arm body is pressed from above, the front end part of the arm body is lifted with the coupling portions as a fulcrum and a locked state with the lock portion is released. In this way, the housing becomes separable from the mating housing. Note that a housing including a lock arm is also disclosed in Patent Document 2.

PRIOR ART DOCUMENT

Patent Document

Patent Document 1: JP 2020-129437 A
Patent Document 2: JP 2019-033062 A

SUMMARY OF THE INVENTION

Problems to be Solved

The aforementioned housing including the lock arm is required to be reduced in size. However, if an attempt is made to shorten a length of the housing in the front-rear direction, a length of the lock arm also needs to be shortened. If the length of the lock arm is shortened, there is a problem that the entire lock arm moves downward and it becomes difficult to release the locked state of the lock arm when a releasing portion of the lock arm is pressed from above.

Accordingly, the present disclosure aims to provide a technique capable of facilitating the release of a locked state of a lock arm.

Means to Solve the Problem

The present disclosure is directed to a connector with a housing and a terminal fitting to be accommodated into the housing, the housing including a housing body for accommodating the terminal fitting, a pair of side walls projecting from an outer surface of the housing body and arranged side by side in a width direction of the housing, a lock arm arranged between the pair of side walls and supported on the pair of side walls displaceably like a seesaw, and a projection provided on a facing surface of the housing body and the lock arm and serving as a fulcrum of a seesaw movement of the lock arm.

Effect of the Invention

According to the present disclosure, a locked state of the lock arm can be easily released.

DETAILED DESCRIPTION TO EXECUTE THE INVENTION

Description of Embodiments of Present Disclosure

Figure 1:
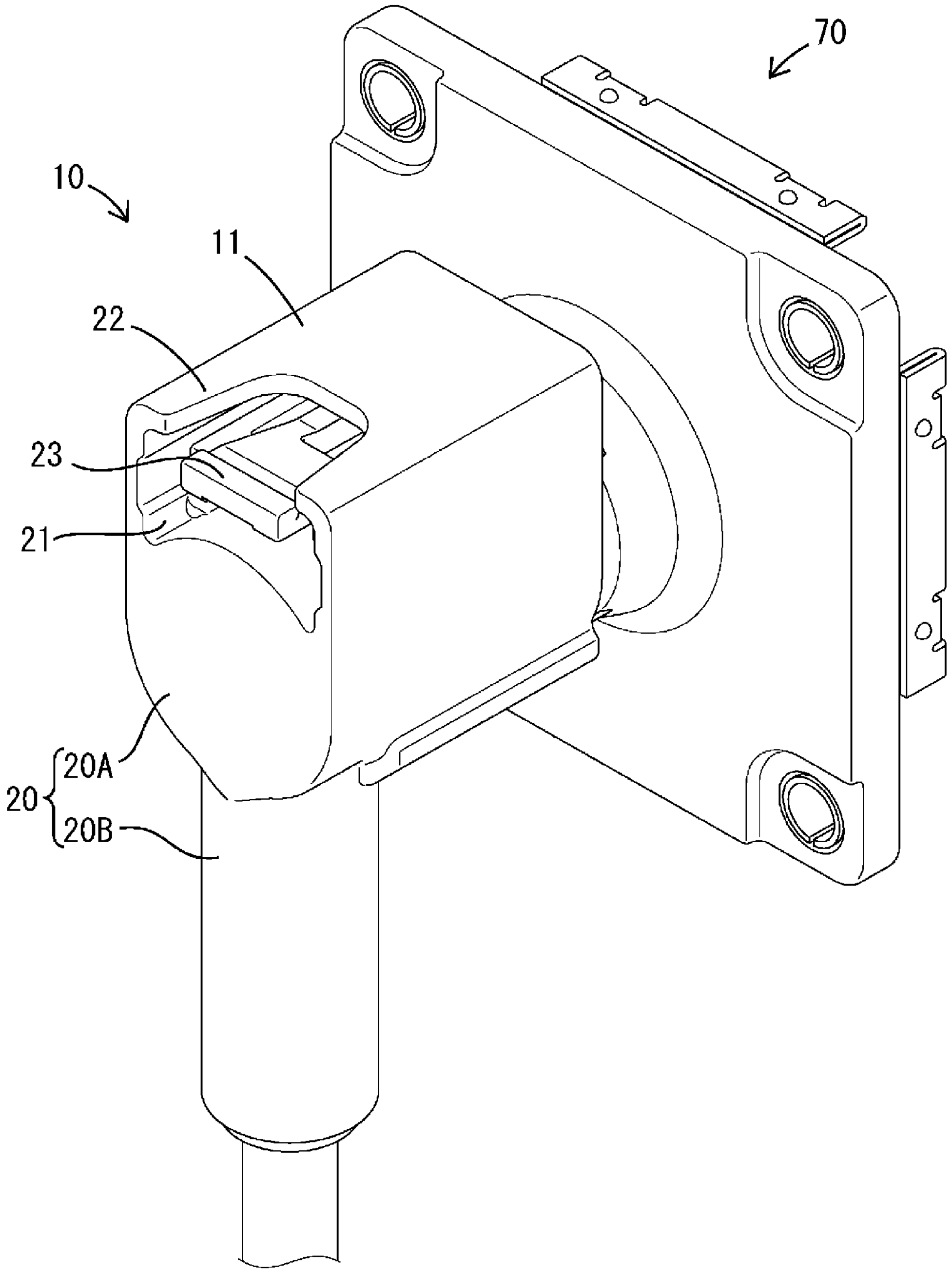
FIG. 1 is a perspective view showing a state where a connector of one embodiment is connected to a mating connector.

First, embodiments of the present disclosure are listed and described.

(1) The connector of the present disclosure is provided with a housing and a terminal fitting to be accommodated into the housing, the housing including a housing body for accommodating the terminal fitting, a pair of side walls projecting from an outer surface of the housing body and arranged side by side in a width direction of the housing, a lock arm arranged between the pair of side walls and supported on the pair of side walls displaceably like a seesaw, and a projection provided on a facing surface of the housing body and the lock arm and serving as a fulcrum of a seesaw movement of the lock arm.

The connector of the present disclosure includes the projection provided on the facing surface of the housing body and the lock arm and serving as a fulcrum of a seesaw movement of the lock arm. Thus, even if the entire lock arm moves toward the housing body when a rear end part thereof is pressed toward the housing body, the lock arm is displaced like a seesaw with the projection as a fulcrum when the projection is sandwiched between the lock arm and the housing body. Therefore, according to this connector, a locked state of the lock arm can be easily released.

(2) Preferably, the lock arm includes an arm portion extending along a front-rear direction, a locking portion provided on a front end part of the arm portion, the locking portion locking a mating housing, and a pair of protruding portions protruding from both sides in the width direction of the arm portion and coupled to an object to be coupled behind the locking portion, and the projection is arranged closer to the locking portion than a coupling portion coupled to the protruding portions, out of the object to be coupled.

According to this configuration, since the projection is arranged closer to the locking portion than the coupling portion supporting the arm portion, the locking portion provided on the front end part of the arm portion more easily moves in a direction separating from the housing body when the lock arm is displaced like a seesaw. Thus, a force necessary to release the locked state of the lock arm can be reduced.

(3) Preferably, the housing body has a curved housing side facing surface facing the lock arm, and the projection is provided on the housing side facing surface.

In a configuration in which the housing body has the curved housing side facing surface, the lock arm may be inclined when the projection contacts the housing side facing surface if the projection is provided on the side of the lock arm. However, the projection is provided on the housing side facing surface. Thus, in this connector, the posture of the lock arm when the projection is sandwiched between the lock arm and the housing body can be stabilized.

(4) Preferably, the projection includes a fulcrum portion to be held in line contact with an object to be contacted when the lock arm makes the seesaw movement.

According to this configuration, since the fulcrum portion of the projection comes into line contact with the object to be contacted when the lock arm makes a seesaw movement, the posture of the object in contact with the projection can be more stabilized.

(5) Preferably, a pair of the projections are arranged at an interval in the width direction of the housing.

According to this configuration, the posture of the object in contact with the projection can be more stabilized.

DETAILS OF EMBODIMENT OF PRESENT DISCLOSURE

Embodiment

One specific embodiment of a connector of the present disclosure is described with reference to FIGS. 1 to 11. Note that the present invention is not limited to these illustrations, but is represented by claims and intended to include all changes in the scope of claims and in the meaning and scope of equivalents.

Figure 2:
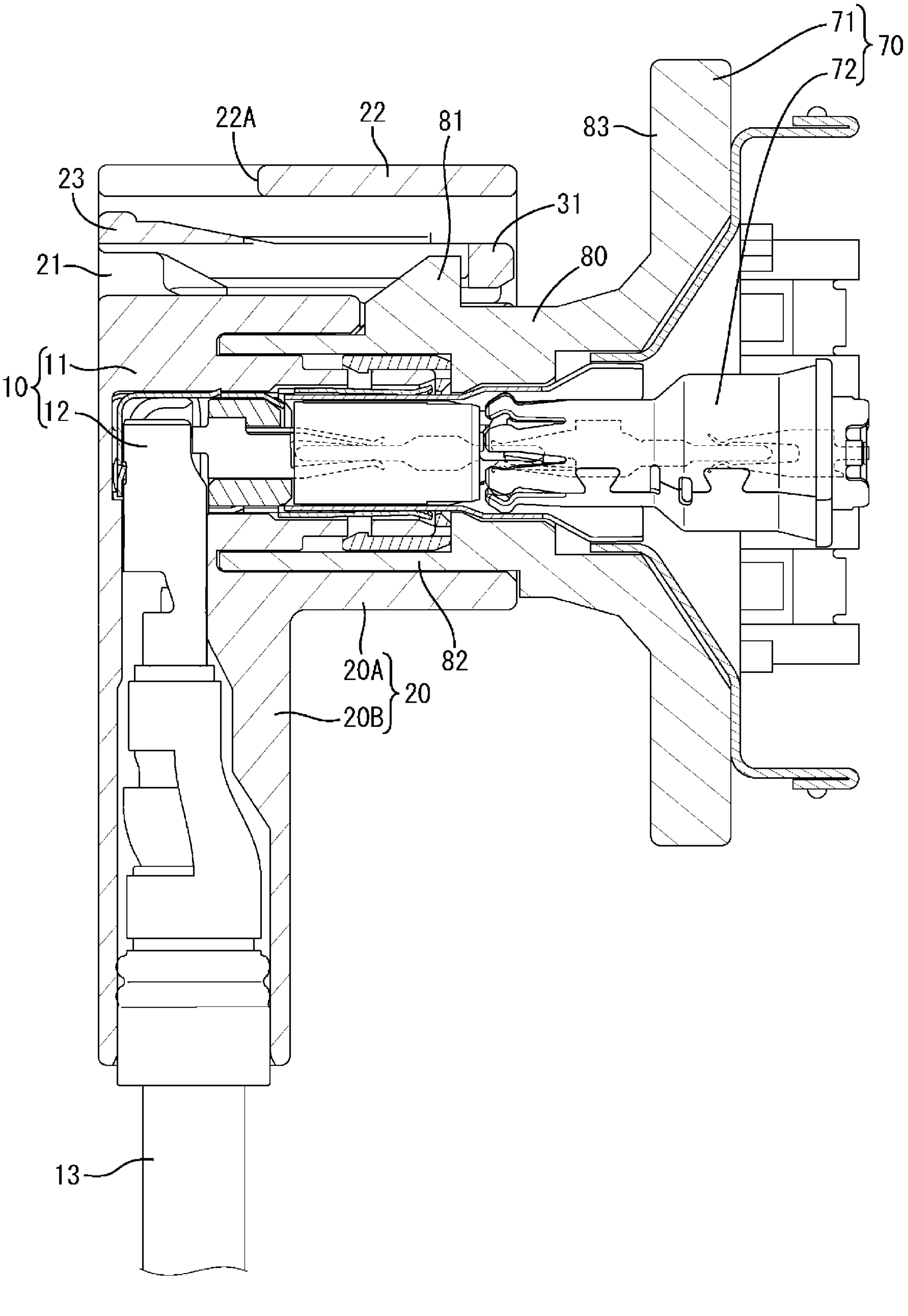
FIG. 2 is a side view in section showing the state where the connector is connected to the mating connector.
Figure 6:
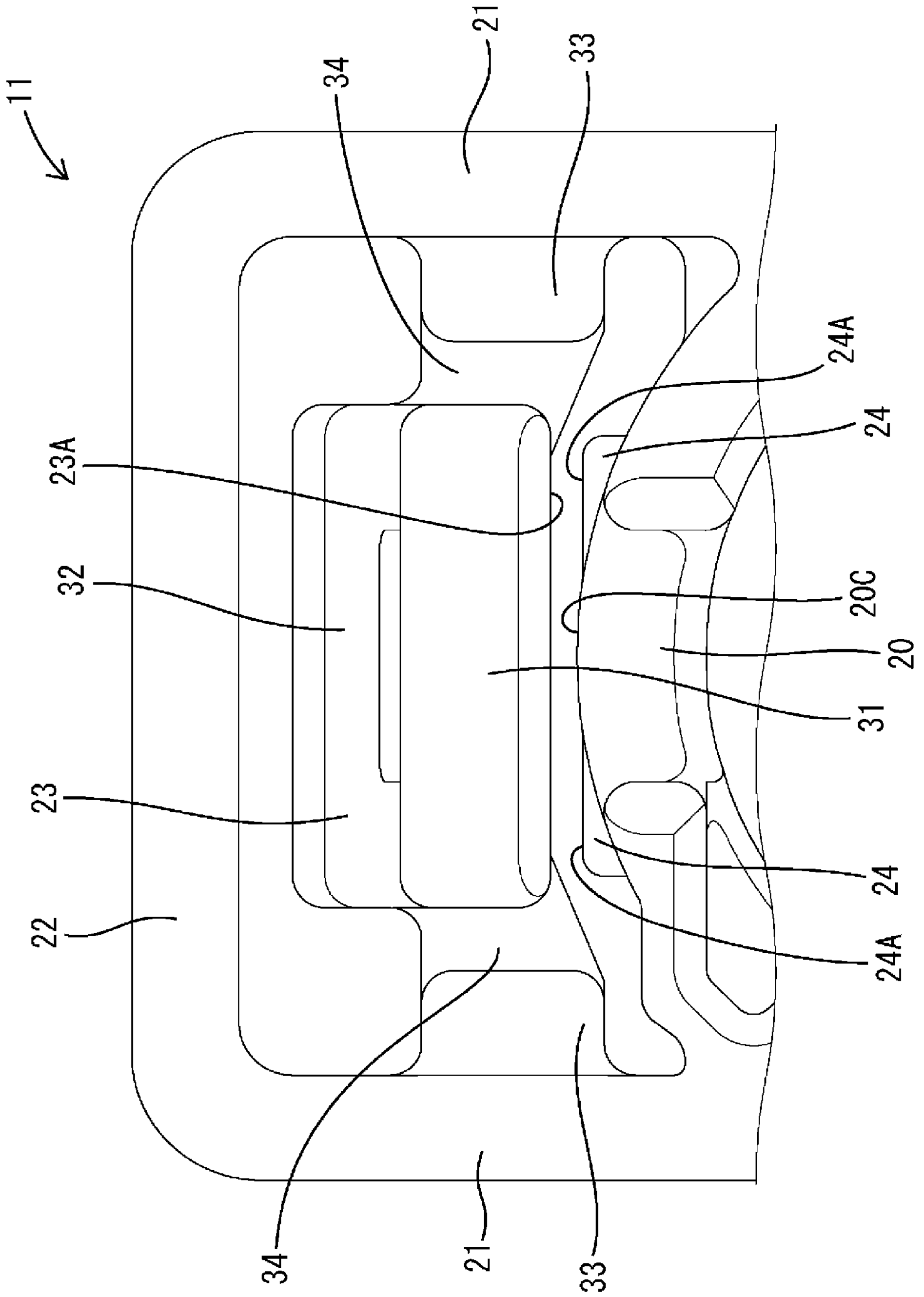
FIG. 6 is a front view of a part of the housing around the lock arm.
Figure 7:
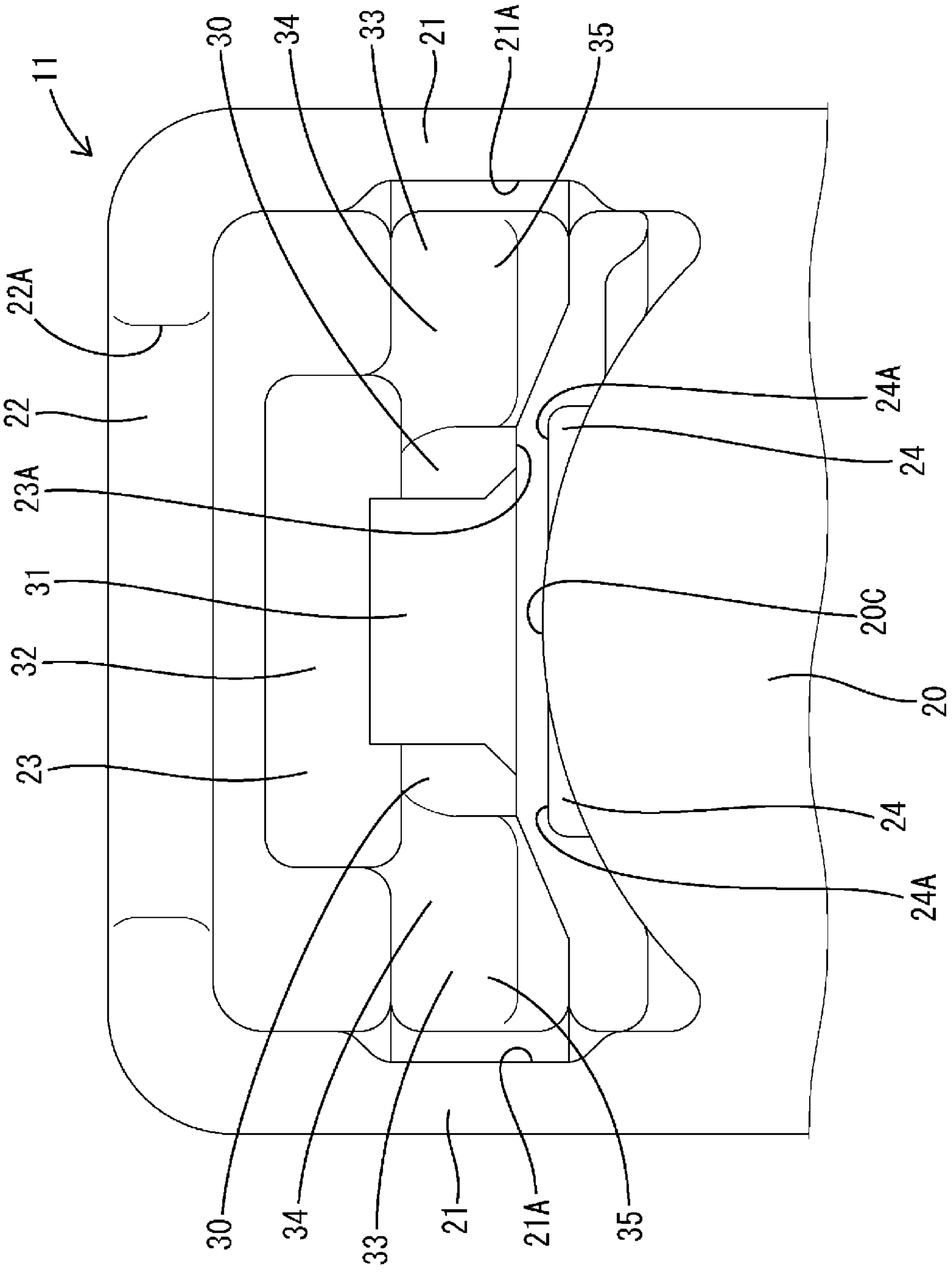
FIG. 7 is a back view of the part of the housing around the lock arm.

A connector 10 of this embodiment is connected to a mating connector 70 as shown in FIGS. 1 and 2. In this embodiment, facing directions when the connector 10 and the mating connector 70 are connected to each other are defined as forward directions, and opposite directions are defined as rearward directions. Upper and lower sides shown in FIGS. 1 to 3 and 6 to 11 are directly defined as upper and lower sides concerning a vertical direction. A vertical direction in FIGS. 4 and 5 and a lateral direction in FIGS. 6 and 7 are defined as a lateral direction. Note that the lateral direction is equivalent to width directions of the connector 10 and the mating connector 70.

As shown in FIG. 2, the connector 10 is provided with a housing 11 and a terminal fitting 12 to be accommodated into the housing 11. The terminal fitting 12 is a female terminal fitting and formed, such as by bending a metal plate. A mating terminal fitting 72 is connected to one end of the terminal fitting 12, and a wire 13 is connected to the other end of the terminal fitting 12.

Figure 3:
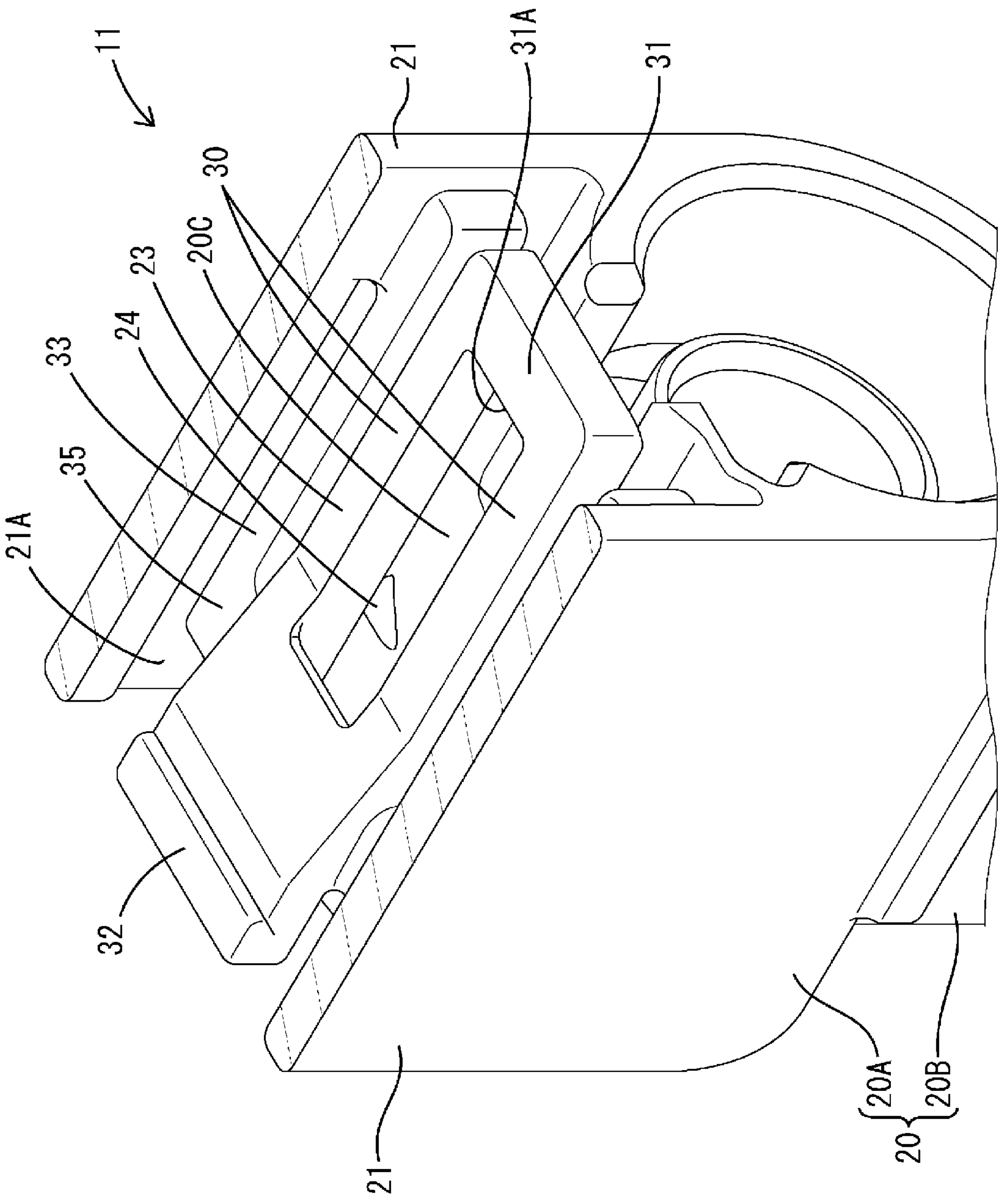
FIG. 3 is a perspective view of a housing with a ceiling wall part cut.

The housing 11 is made of synthetic resin. As shown in FIGS. 1 and 3, the housing 11 includes a housing body 20, side walls 21, a ceiling wall 22, a lock arm 23 and projections 24.

As shown in FIG. 2, the housing body 20 accommodates the terminal fitting 12 inside. The housing body 20 includes a hollow cylindrical portion 20A having a hollow cylindrical shape extending in a front-rear direction and an extending portion 20B having a hollow cylindrical shape extending downward from a rear end part of the hollow cylindrical portion 20A. An internal space of the hollow cylindrical portion 20A is open forward of the hollow cylindrical portion 20A and communicates with an internal space of the extending portion 20B. The terminal fitting 12 is accommodated in these communicating spaces. The internal space of the extending portion 20B is open downward of the extending portion 20B. From this open part, the wire 13 connected to the terminal fitting 12 is pulled out to the outside of the housing body 20.

As shown in FIGS. 1, 6 and 7, a pair of left and right side walls 21 are provided on the upper surface of the housing body 20 (in other words, on the upper surface of the hollow cylindrical portion 20A). Specifically, the side walls 21 respectively rise upward from both left and right end parts of the housing body 20 and extend in the front-rear direction. The lock arm 23 is arranged between the pair of side walls 21. The pair of side walls 21 support the lock arm 23 displaceably like a seesaw. Upper end parts of the pair of side walls 21 are coupled by the ceiling wall 22.

Figure 4:
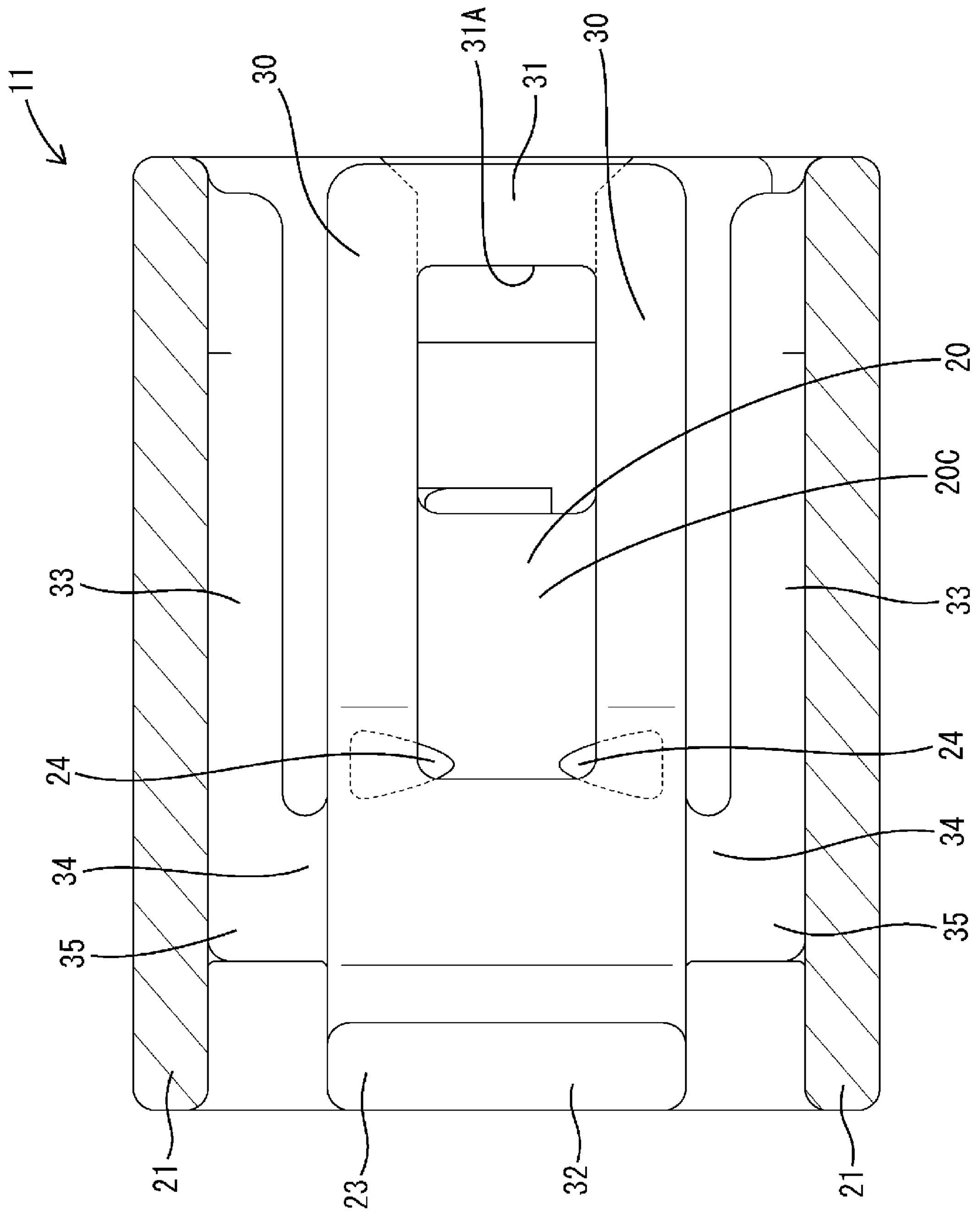
FIG. 4 is a plan view in section of the housing with the ceiling wall part cut.
Figure 5:
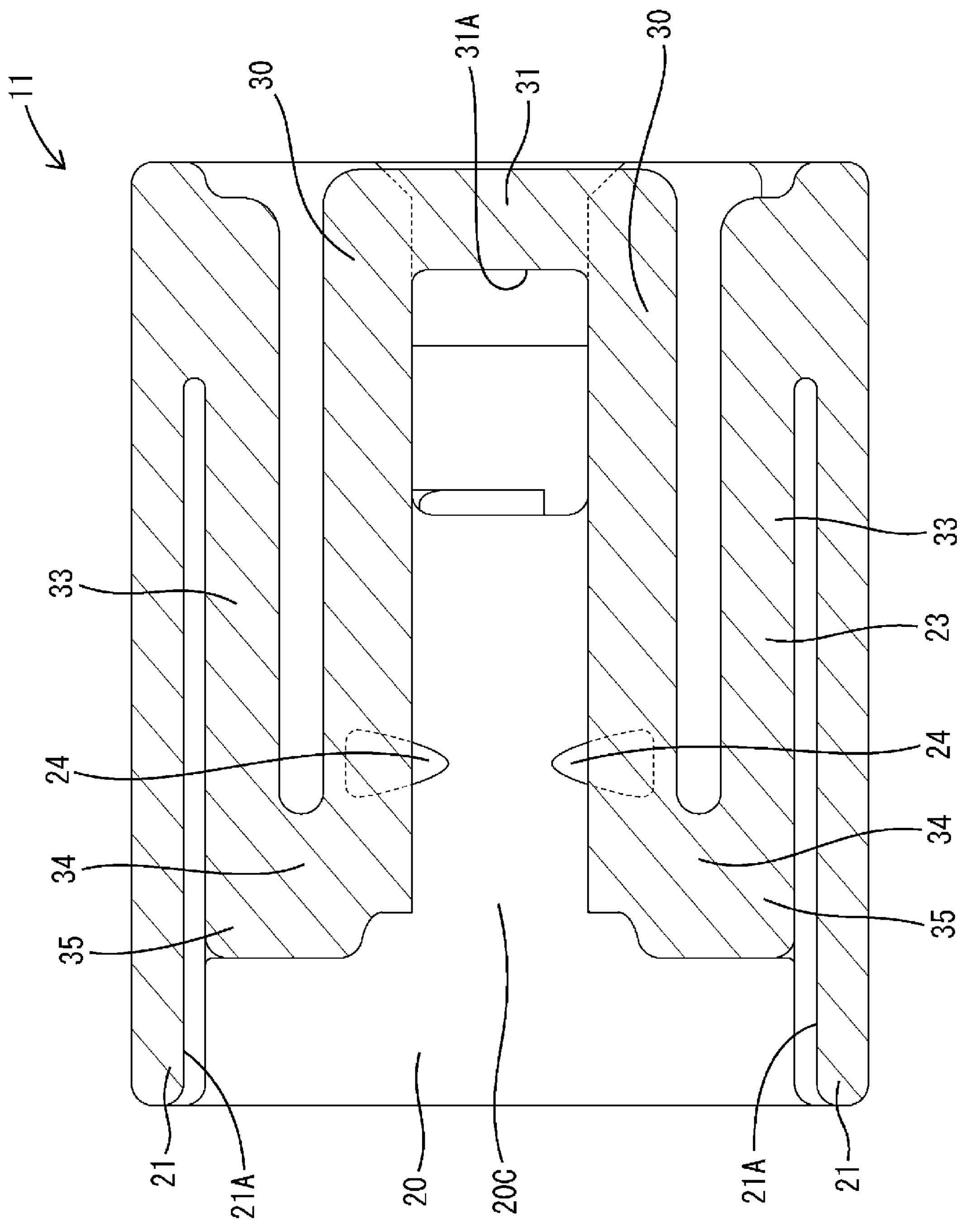
FIG. 5 is a plan view in section of the housing cut along a virtual plane passing through a lock arm.

As shown in FIGS. 3 to 5, the lock arm 23 includes arm portions 30, a locking portion 31, an operating portion 32, support arms 33 and protruding portions 34.

As shown in FIGS. 3 to 5, a pair of left and right arm portions 30 are provided to extend along the front-rear direction. The locking portion 31 is provided on front end parts of the arm portions 30. Specifically, the locking portion 31 is configured to couple the front end parts of the pair of left and right arm portions 30, and the rear surface thereof is constituted as a locking surface 31A. The operating portion 32 is provided on rear end parts of the arm portions 30. Specifically, the operating portion 32 is configured to couple the rear end parts of the pair of left and right arm portions 30 and projects obliquely upward toward the rear.

As shown in FIGS. 3 to 5, a pair of left and right support arms 33 are provided and respectively coupled to the side walls 21 on the left and right sides. The support arm 33 is coupled to a front end side of the inner side surface of the side wall 21 and extends rearward from a part coupled to the side wall 21. A recess 21A recessed away from the support arm 33 is formed in the inner side surface of the side wall 21. The recess 21A is formed from a rear side of the part of the support arm 33 coupled to the side wall 21 to the rear end of the side wall 21.

As shown in FIGS. 4 and 5, the protruding portions 34 protrude from both left and right sides of rear end sides of the arm portions 30 and are coupled to rear end parts of the support arms 33. That is, the support arm 33 corresponds to an "object to be coupled". A part of the support arm 33 coupled to the protruding portion 34, i.e. the rear end part of the support arm 33, is referred to as a coupling portion 35 below. The arm portion 30 is supported displaceably like a seesaw with this coupling portion 35 as a fulcrum. Particularly, the protruding portion 34 has a lower rigidity than the support arm 33. Thus, the arm portion 30 is easily displaced like a seesaw. Further, the aforementioned operating portion 32 projects further rearward than the rear ends of the protruding portions 34.

As shown in FIG. 1, the left and right side surfaces of the lock arm 23 are entirely covered by the pair of side walls 21. The upper surface of the lock arm 23 is covered by the ceiling wall 22 except the operating portion 32. A rear end part of the ceiling wall 22 is formed with a cut portion 22A cut to expose the upper surface of the operating portion 32.

As shown in FIGS. 6 and 7, the lock arm 23 is arranged above the housing body 20 and facing the housing body 20 in the vertical direction. The lock arm 23 (specifically, the arm portions 30) has a lock arm side facing surface 23A facing the housing body 20. The lock arm side facing surface 23A is a flat surface facing toward the housing body 20. The housing body 20 has a housing side facing surface 20C facing the lock arm 23. The housing side facing surface 20C is a curved surface. Specifically, the housing side facing surface 20C is curved downward from a center toward outside sides in the lateral direction when viewed from behind. The projections 24 are provided on the housing side facing surface 20C. A facing distance between the lock arm side facing surface 23A and the housing side facing surface 20C is uneven in the lateral direction, i.e. minimum in the center and maximum at both left and right ends.

The projections 24 are parts serving as a fulcrum of a seesaw movement of the lock arm 23. As shown in FIGS. 6 and 7, the projections 24 project from the housing side facing surface 20C toward the lock arm 23. A pair of the projections 24 are arranged at an interval in the lateral direction. The projection 24 is formed such that an upper part of a cylinder having an axis oriented in the lateral direction is exposed above the housing facing surface 20C. The pair of projections 24 are arranged on both left and right sides across an apex of the housing side facing surface 20C, and the upper ends thereof are set at positions lower than the apex of the housing side facing surface 20C.

As shown in FIGS. 4 and 5, the projections 24 are arranged closer to the locking portion 31 than the protruding portions 34 and the coupling portion 35. That is, the projections 24 are arranged between the protruding portions 34 and the coupling portions 35 and the locking portion 31 in the front-rear direction. In the lateral direction, the outer ends of the pair of projections 24 are arranged inwardly of the outer ends of the pair of arm portions 30 and outwardly of the inner ends of the pair of arm portions 30, and the inner ends of the projections 24 are arranged inwardly of the inner ends of the pair of arm portions 30.

As shown in FIGS. 1 and 2, the mating connector 70 is provided with a mating housing 71 and the mating terminal fitting 72. The mating terminal fitting 72 is a male terminal fitting and formed, such as by bending a metal plate. The mating terminal fitting 72 is connected to the terminal fitting 12 with the housing 11 connected to the mating housing 71.

Figure 8:
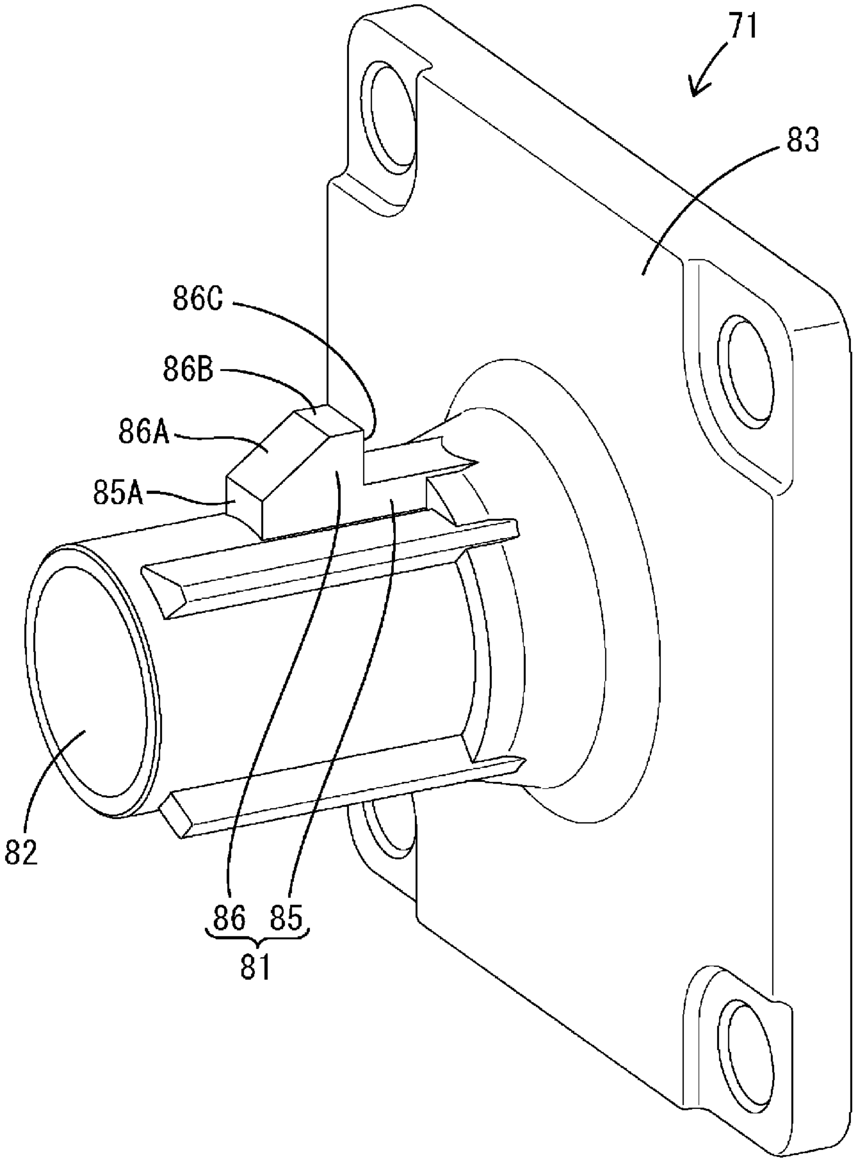
FIG. 8 is a perspective view of a mating housing.

As shown in FIG. 8, the mating housing 71 includes a mating housing body 80 and a lock receiving portion 81 provided on the outer surface of the mating housing body 80. The mating housing body 80 includes a mating hollow cylindrical portion 82 having a hollow cylindrical shape and a flange portion 83 protruding from the outer periphery of a rear end part of the mating hollow cylindrical portion 82.

As shown in FIG. 8, the lock receiving portion 81 is provided on the upper surface of the mating housing body 80 (in other words, on the upper surface of the mating hollow cylindrical portion 82). The lock receiving portion 81 includes a locking base portion 85 and a locking protrusion 86.

As shown in FIG. 8, the locking base portion 85 is provided on the upper surface of the mating housing body 80. The locking base portion 85 extends in the front-rear direction along the upper surface of the mating housing body 80. A rear end part of the locking base portion 85 is coupled to the flange portion 83. The front end of the locking base portion 85 is arranged behind the front end of the mating hollow cylindrical portion 82. A front surface 85A of the locking base portion 85 rises perpendicularly from the upper surface of the mating hollow cylindrical portion 82 and is arranged to face forward.

As shown in FIG. 8, the locking protrusion 86 projects upward from the locking base portion 85. The locking protrusion 86 projects upward from a front end part of the locking base portion 85. The locking protrusion 86 has a guiding surface 86A, a flat surface 86B and a lock receiving surface 86C. The guiding surface 86A is inclined upward toward the rear. The front end of the guiding surface 86A is connected to the upper end of the front surface 85A of the locking base portion 85 without any step. The flat surface 86B is a flat surface along the front-rear direction and constitutes the upper surface of the locking protrusion 86. The front end of the flat surface 86B is connected to the rear end of the guiding surface 86A without any step. The lock receiving surface 86C is a flat surface along the vertical direction, and constitutes the rear surface of the locking protrusion 86. The upper end of the lock receiving portion 86C is connected to the rear end of the flat surface 86B without any step.

Figure 9:
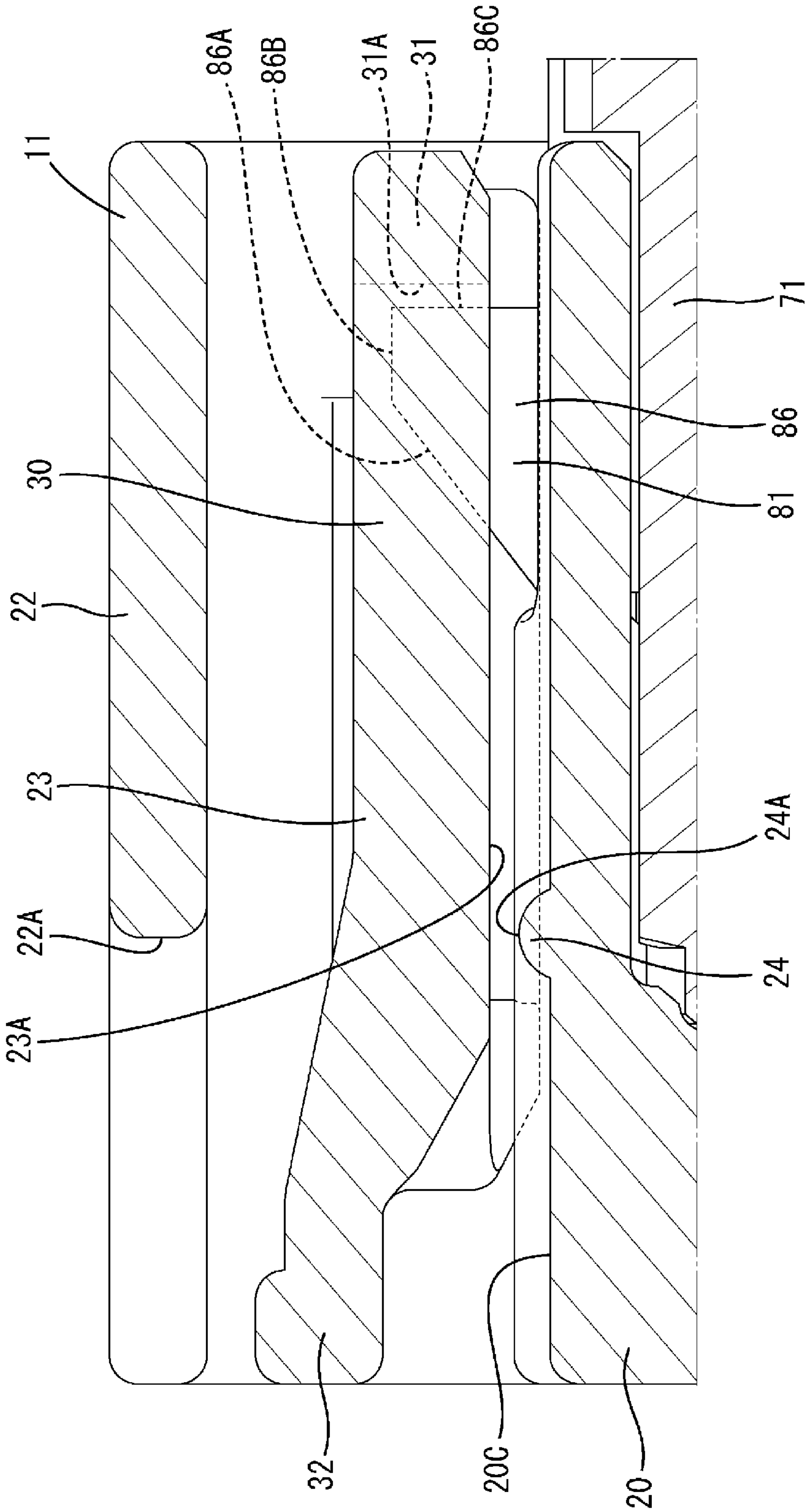
FIG. 9 is a side view in section showing a locked state of a locking portion and a lock receiving portion.

Functions and effects of the connector 10 are described next. In the process of connecting the housing 11 to the mating housing 71, the lock arm 23 is deflected and deformed by the front end part (specifically, the locking portion 31) being guided by the guiding surface 86A of the lock receiving portion 81. When the front end part (specifically, the locking portion 31) of the lock arm 23 rides over the lock receiving portion 81, the lock arm 23 returns to an original shape by a resilient force thereof. In this way, as shown in FIGS. 2 and 9, the locking surface 31A of the locking portion 31 faces the lock receiving surface 86C of the lock receiving portion 81 in the front-rear direction. Thus, a rearward displacement of the locking portion 31 is restricted by the lock receiving portion 86C. By locking the lock arm 23 to the lock receiving portion 81 in this way, a connected state of the housing 11 and the mating housing 71 is maintained.

Figure 10:
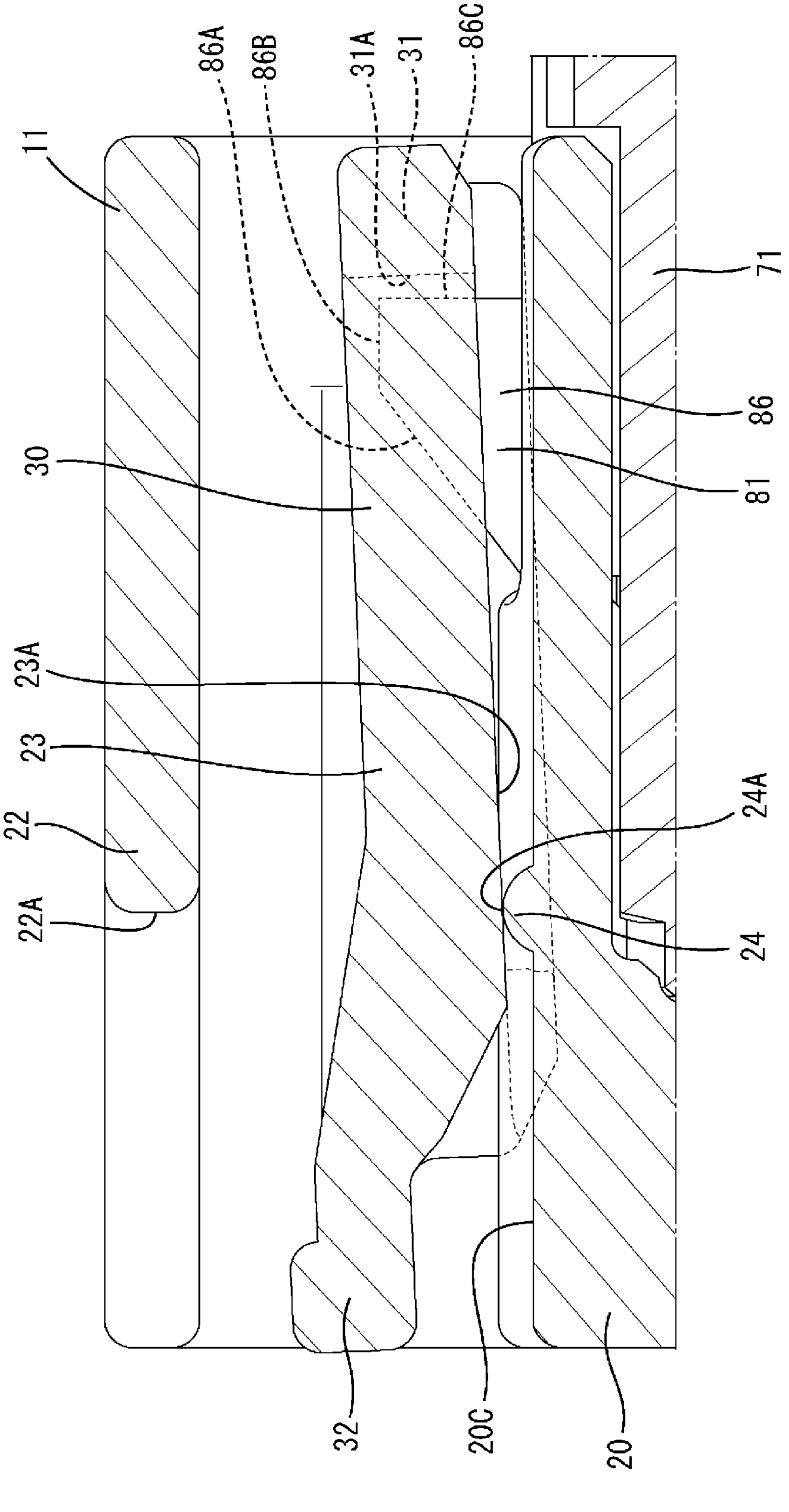
FIG. 10 is a side view in section showing a state where the lock arm pressed downward in the locked state is in contact with projections.
Figure 11:
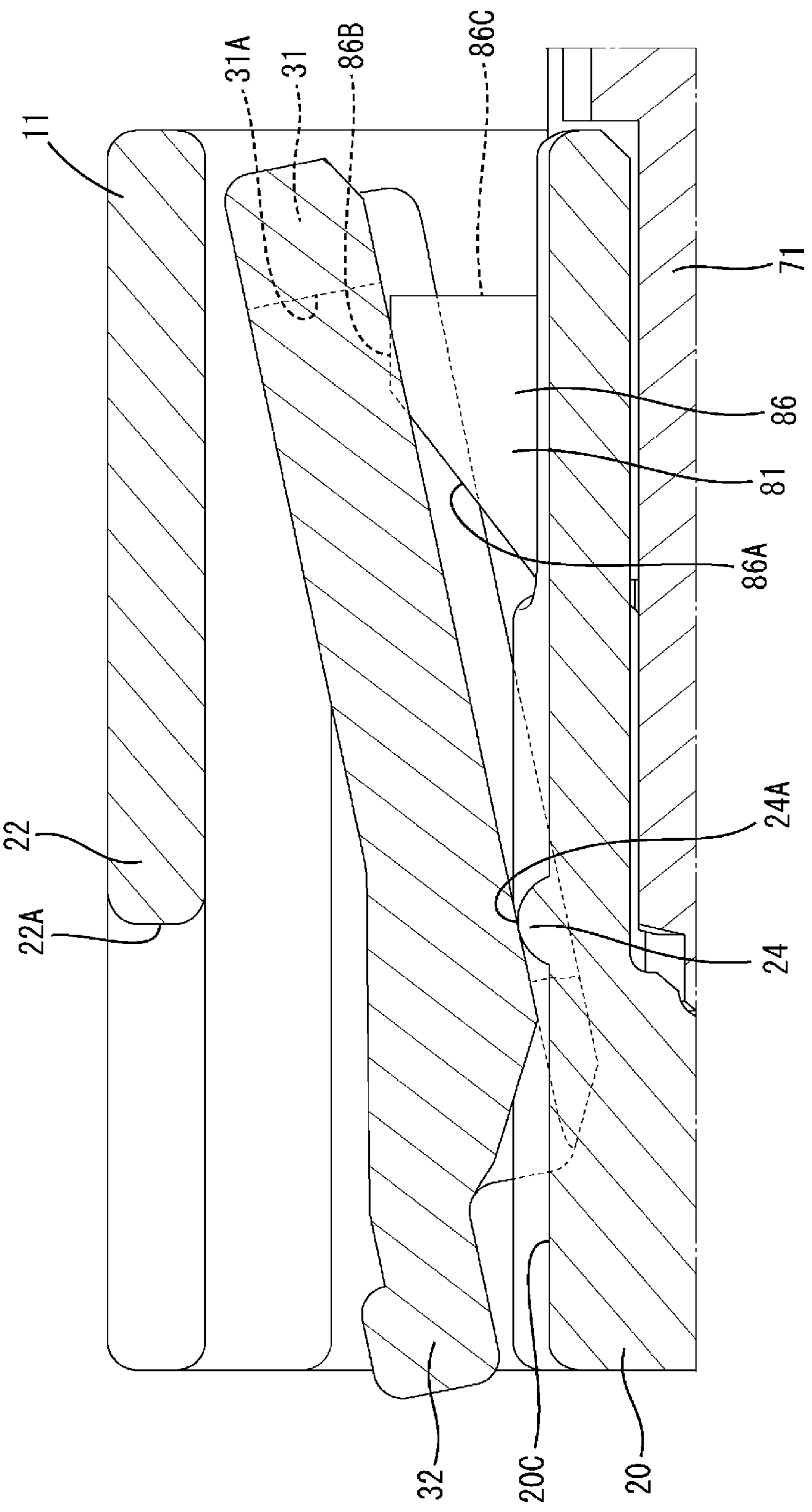
FIG. 11 is a side view in section showing a state where the lock arm is displaced like a seesaw with the projections as a fulcrum.

A locked state of the lock arm 23 and the lock receiving portion 81 is released as follows. If the operating portion 32 of the lock arm 23 is pressed downward, the lock arm 23 entirely moves downward and, as shown in FIG. 10, the rear end sides of the arm portions 30 contact the projections 24. If the operating portion 32 is further pressed downward, the arm portions 30 are displaced like a seesaw with the projections 24 as a fulcrum and the front end parts of the arm portions 30 move upward. If the locking portion 31 moves further upward than the lock receiving portion 81 as shown in FIG. 11, the locked state of the lock arm 23 and the lock receiving portion 81 is released. If the housing 11 is pulled rearward from this state, the housing 11 is separated from the mating housing 71.

As described above, the connector 10 includes the projections 24 serving as a fulcrum of a seesaw movement of the lock arm 23 on the housing side facing surface 20C facing the lock arm 23. Thus, even if the entire lock arm 23 moves downward when the operating portion 32 is pressed downward, the lock arm 23 is displaced like a seesaw with the projections 24 as a fulcrum when the projections 24 are sandwiched between the lock arm 23 and the housing body 20. Therefore, according to this connector 10, the locked state of the lock arm 23 can be easily released.

Further, in the connector 10, the projections 24 are arranged closer to the locking portion 31 than the coupling portions 35 supporting the arm portions 30. Thus, when the lock arm 23 is displaced like a seesaw, the locking portion 31 provided on the front end parts of the arm portions 30 more easily moves in a direction separating from the housing body 20. Therefore, a force necessary to release the locked state of the lock arm 23 can be reduced.

Further, in a configuration in which the housing body 20 has the curved housing side facing surface 20C, the lock arm 23 may be inclined when the projections 24 contact the housing facing surface 20C if the projections 24 are provided on the side of the lock arm 23. However, the projections 24 are provided on the housing facing surface 20C. Thus, in the connector 10, the posture of the lock arm 23 when the projections 24 are sandwiched between the lock arm 23 and the housing body 20 can be stabilized.

Further, in the connector 10, fulcrum portions 24A of the projections 24 are in line contact with the arm portions 30 when the lock arm 23 makes a seesaw movement. Thus, in the connector 10, the postures of the arm portions 30 in contact with the projections 24 can be more stabilized.

Further, in the connector 10, the pair of projections 24 are arranged at an interval in the width direction of the housing 11. Thus, the postures of the arm portions 30 in contact with the projections 24 can be more stabilized.

Other Embodiments

The present invention is not limited to the above described and illustrated embodiment, but is represented by claims. The present invention is intended to include all changes in the scope of claims and in the meaning and scope of equivalents and also include the following embodiments.

Although the projections are provided only on the housing facing surface, out of the facing surfaces of the housing body and the lock arm, in the above embodiment, the projections may be provided only on the lock arm side facing surface or may be provided on both facing surfaces.

Although the projections are provided closer to the locking portion than the coupling portions in the above embodiment, the projections may be at the same position as or behind the coupling portions in the front-rear direction if the projections are located forward of the rear end of the operating portion 32 in the front-rear direction.

Although the pair of projections are provided in the above embodiment, one projection may be provided.

LIST OF REFERENCE NUMERALS

10 . . . connector
11 . . . housing
12 . . . terminal fitting
13 . . . wire
20 . . . housing body
20A . . . hollow cylindrical portion
20B . . . extending portion
20C . . . housing side facing surface
21 . . . side wall
21A . . . recess
22 . . . ceiling wall
22A . . . cut portion
23 . . . lock arm
23A . . . lock arm side facing surface
24 . . . projection
24A . . . fulcrum portion
30 . . . arm portion
31 . . . locking portion
31A . . . locking surface
32 . . . operating portion
33 . . . support arm
34 . . . protruding portion
35 . . . coupling portion
70 . . . mating connector
71 . . . mating housing
72 . . . mating terminal fitting
80 . . . mating housing body
81 . . . lock receiving portion
82 . . . mating hollow cylindrical portion
83 . . . flange portion
85 . . . locking base portion
85A . . . front surface of locking base portion
86 . . . locking protrusion
86A . . . guide surface
86B . . . flat surface
86C . . . lock receiving surface

What is claimed is:

1. A connector, comprising:
a housing; and
a terminal fitting to be accommodated into the housing, the housing including:
a housing body for accommodating the terminal fitting;
a pair of side walls projecting from an outer surface of the housing body and arranged side by side in a width direction of the housing;
a lock arm arranged between the pair of side walls and supported on the pair of side walls displaceably like a seesaw; and
a projection provided on a facing surface of the housing body and the lock arm and serving as a fulcrum of a seesaw movement of the lock arm,
wherein the lock arm includes:
an arm portion extending along a front-rear direction;
a locking portion provided on a front end portion of the arm portion, the locking portion locking a mating housing; and
a pair of protruding portions protruding from both sides in the width direction of the arm portion and coupled to an object to be coupled behind the locking portion, and
the projection is arranged closer to the locking portion than a coupling portion coupled to the protruding portions, out of the object to be coupled.

2. The connector of claim 1, wherein:
the housing body has a curved housing side facing surface facing the lock arm, and
the projection is provided on the housing side facing surface.

3. The connector of claim 1, wherein the projection includes a fulcrum portion to be held in line contact with an object to be contacted when the lock arm makes the seesaw movement.

4. The connector of claim 1, wherein a pair of the projections are arranged at an interval in the width direction of the housing.

5. The connector of claim 1, wherein the projection is disposed between the protruding portions and the locking portion in the front-rear direction.

6. The connector of claim 1, wherein:

in the width direction, outer ends of a pair of the projections are arranged inwardly of outer ends of a pair of the arm portions and outwardly of inner ends of the arm portions, and inner ends of the projections are arranged inwardly of the inner ends of the arm portions.

7. A connector, comprising:

a housing; and a terminal fitting to be accommodated into the housing, the housing including:

a housing body for accommodating the terminal fitting;

a pair of side walls projecting from an outer surface of the housing body and arranged side by side in a width direction of the housing;

a lock arm arranged between the pair of side walls and supported on the pair of side walls displaceably like a seesaw; and a projection provided on a facing surface of the housing body and the lock arm and serving as a fulcrum of a seesaw movement of the lock arm, wherein the housing body has a curved housing side facing surface facing the lock arm, and the projection is provided on the housing side facing surface.

* * * * *